Dec. 11, 1962 G. G. CANTER ETAL 3,068,033
TAMPER-PROOF SHEET METAL SEAL
Filed July 1, 1960

INVENTORS
GEORGE G. CANTER
GILBERT G. CANTER
BY
Byerly Townsend Watson & Churchill
ATTORNEYS.

3,068,033
TAMPER-PROOF SHEET METAL SEAL
George G. Canter, 2310 Creston Ave., Bronx, and Gilbert
G. Canter, 200 W. 20th St., both of New York, N.Y.
Filed July 1, 1960, Ser. No. 40,401
3 Claims. (Cl. 292—317)

The present invention relates to tamper-proof sheet metal joints or seals and aims to provide certain improvements therein.

Tamper-proof joints, seams, or seals have numerous application and one such use is on car seals which are usually formed from a sheet metal blank bent to provide a chambered head and a flexible shackle secured to the base of the head at one of its ends, said chambered head having an opening for receiving the free end of the shackle and locking means for automatically securing said free end of the shackle when inserted into the opening in the head. For permanently closing the head it is formed with lateral flanges which are brought into overlying relation to the base, side portions of which are folded over the flanges to form a seam which is crimped and/or indented to prevent opening thereof to gain unauthorized access to the interior of the head to disengage the locking means. Various forms of crimping and indenting of the interengaged flanges have been proposed to defy opening of the flanges and the resealing thereof, but so far as we are aware none of said proposed constructions have accomplished their intended function.

The primary object of the present invention is to provide a tamper-proof seal for the interengaged edges and flanges of sheet metal seams such as are present on a car seal head or analogous sealing devices.

A further object of the invention is to provide a tamper-proof seal of the character set forth which cannot be opened and resealed without providing manifest evidence of tampering.

The foregoing and other objects of the invention, not specifically enumerated, will become apparent as will also be the novel structure of the joint or seal, from the detailed description which follows, when considered in connection with the accompanying drawings, wherein.

Figure 1:
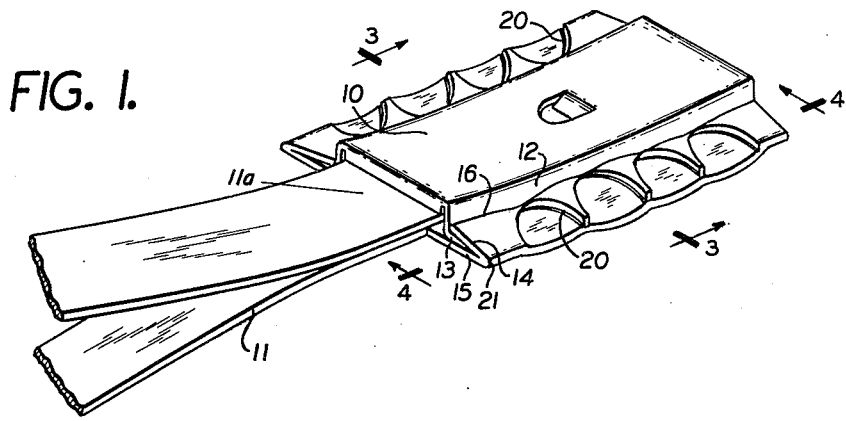
FIG. 1 is a perspective view of the sealed end portion of a car seal embodying the invention.
Figure 2:
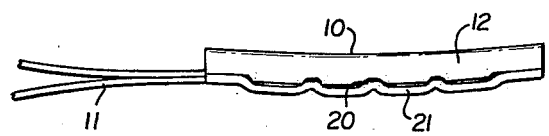
FIG. 2 is a side elevational view of the portion of the car seal shown in FIG. 1.
Figure 3:
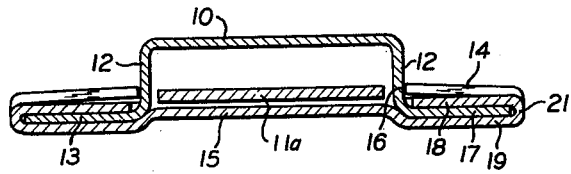
FIG. 3 is a sectional view taken along the line 3—3 of FIG. 1, the locking means within the head of the car seal being omitted.
Figure 4:
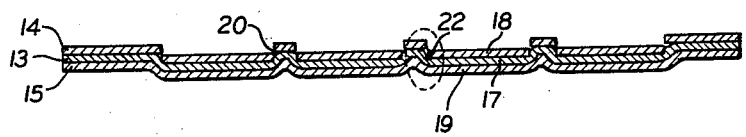
FIG. 4 is a sectional view taken along the line 4—4 of FIG. 1.
Figure 5:
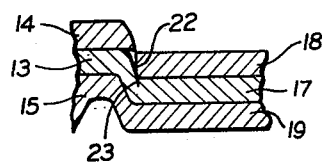
FIG. 5 is a greatly enlarged view of the encircled portion of FIG. 4.

In the drawing, the tamper-proof seal of the invention is shown as applied to the interengaged flanges on the chambered head of a car seal of the general types shown in U.S. Patents Nos. 955,638 and 2,804,333. Such car seals are usually formed from a stamped blank of sheet metal having a thickness of approximately .01 inch by bending operations to provide a chambered head 10 and a shackle or strap 11, the free end 11a of which is inserted into the head wherein means (not shown) are provided for locking and securing the free end of the shackle against withdrawal after insertion.

The head 10 as shown is of channel form having side walls 12 and lateral flanges 13 which are substantially perpendicular to the side walls 12. The base of the head has lateral portions which are folded over to embrace the flanges 13 by thicknesses of metal 14 and 15 to provide a joint composed of three thicknesses of metal with the free edge 16 of the overfolded flanges in abutting relation to the side walls 12. To render such joint secure and prevent access to the locked means within the head by opening the joint, the interfolded thicknesses of metal are crimped and/or indented as shown in the aforementioned patents. The foregoing general types of joints and seals per se have not defied opening of the flanges and the sealing thereof and it is to structures for rendering such seals tamper-proof that the present invention is directed.

According to the present invention a tamper-proof seal is provided by having overlying areas 17, 18 and 19 of the three thicknesses of metal 13, 14 and 15 respectively, deformed out of their normal planes and into the limiting planes of the adjacent thicknesses of metal with a part of the boundary 20 of at least one thickness such as 18, located at other than the fold-line 21 between the thicknesses 14 and 15 being cut completely therethrough as shown at 22 or partially cut as shown at 23. The deformed areas are shown in FIG. 1 as being substantially semi-circular in shape and completely cut through adjacent the regions where the folded over thicknesses 14 abut the sidewalls 12 and outwardly therefrom, but it will be understood that said areas may be all of a configuration other than shown and also that the deformed areas may have different configurations. The deformations to the metal may be accomplished by a hand tool provided with suitable dies.

By completely or partially deforming areas of the overlying thicknesses of metal and cutting through one or more of said thicknesses of metal in the manner shown and described provides a joint which cannot be opened without destroying the seal to such extent as to render it impossible to again seal the joint without obvious visual evidence that the seal has been tampered with.

Although there has been shown and described an embodiment of the invention applied to a car seal, it is to be understood that the concept disclosed is merely exemplary and may have other applications, without departing from the spirit of the invention as hereinafter claimed.

What we claim is:

1. A tamper-proof sheet metal joint comprising a seam formed of three overlying thicknesses of metal one of which is a flange on a supporting part having a wall which is substantially perpendicular to the flange and the other two overlying thickness are integral and embrace said flange with the edge of one embracing thickness abutting said wall of the supporting part, said overlying thicknesses of metal having overlying areas thereof deformed out of their normal planes and into the limiting planes of the adjacent overlying thicknesses, the deformed areas extending to substantially the edge of the embracing thickness which abuts said wall of the supporting part, and the part of the boundary of the deformed areas of said thickness which abuts said wall of the supporting part being cut at least partially therethrough in the region of the said wall of the supporting part.

2. A tamper-proof sheet metal joint according to claim 1 wherein the part of the boundary of the deformed areas of the thickness which abuts the wall of the supporting part is cut substantially therethrough.

3. A tamper proof sheet metal car seal comprising a preformed chambered head having a slot at one end, side walls with laterally extending flanges and a base, a shackle and cooperating means on said head and shackle for locking said head and shackle together when the shackle is inserted into the slot in the head, the preformed head including tamper proof side seams each formed of three overlying thicknesses of metal, one of which is a lateral flange on the side wall of the head and the other two of which are integral and extend laterally from the base of the head and embrace said flange with the edge of the embracing thickness abutting a side wall of the head, said overlying thicknesses of metal having overlying areas thereof deformed out of their normal planes and into the limiting planes of the adjacent thicknesses of metal, the deformed areas extending to substantially the edge of the embracing thickness which abuts the side wall of the head, and the part of the boundary of the deformed areas of said thickness which abuts the side wall of the head being cut at least partially therethrough in the region of said side wall.

References Cited in the file of this patent

UNITED STATES PATENTS

| | | |
|---|---|---|
| 1,251,858 | Brooks | Jan. 1, 1918 |
| 1,517,515 | McGary | Dec. 2, 1924 |
| 1,866,894 | Leslie | July 12, 1932 |

FOREIGN PATENTS

| | | |
|---|---|---|
| 671,197 | France | Aug. 31, 1929 |